Feb. 13, 1934.    C. C. HALL    1,946,740
APPARATUS FOR MOLDING SUNDRY MATERIALS
Filed Dec. 23, 1932    3 Sheets-Sheet 1
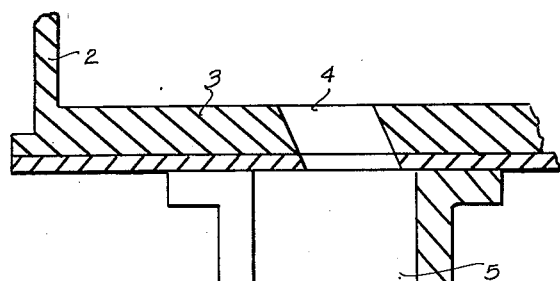
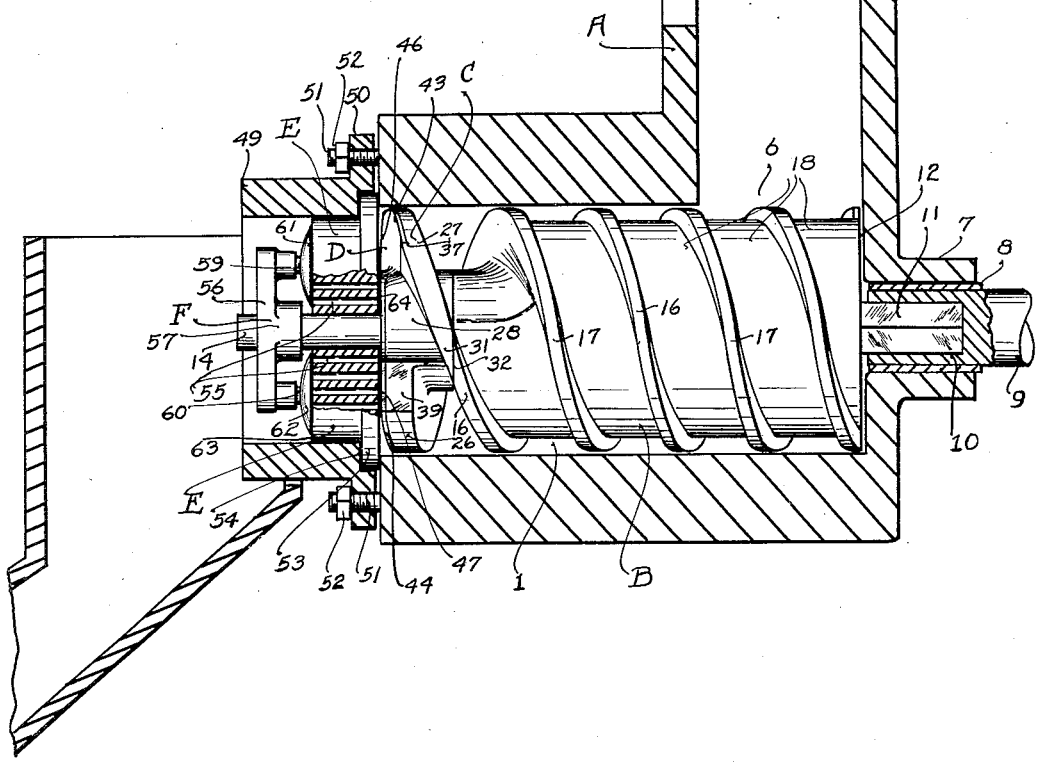
Inventor
Claude C. Hall
By Samuel S. Jacobson
Attorney Feb. 13, 1934.  C. C. HALL  1,946,740
APPARATUS FOR MOLDING SUNDRY MATERIALS
Filed Dec. 23, 1932  3 Sheets-Sheet 2
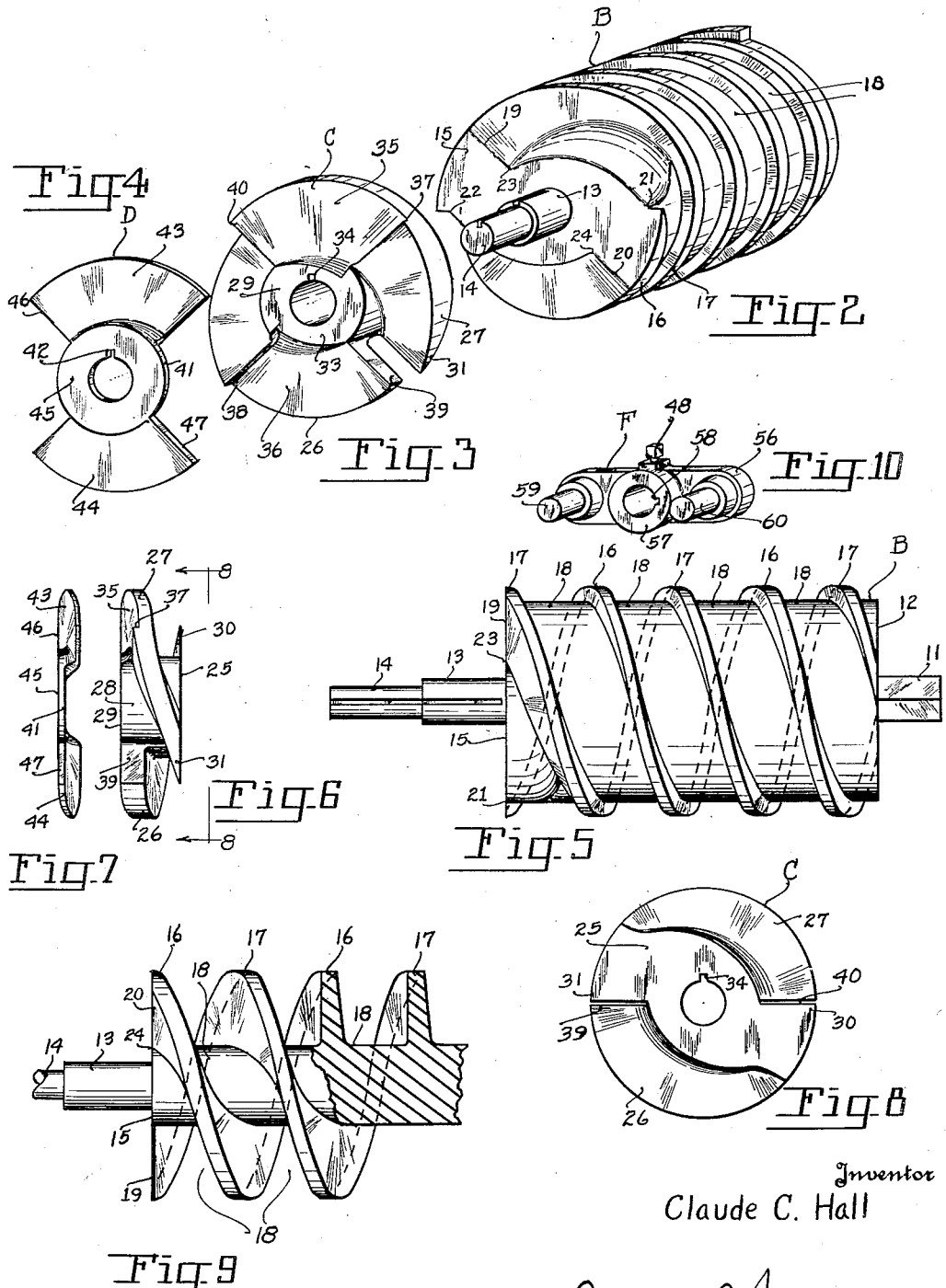
Inventor
Claude C. Hall
By Samuel S. Jacobson
Attorney Feb. 13, 1934.      C. C. HALL      1,946,740
APPARATUS FOR MOLDING SUNDRY MATERIALS
Filed Dec. 23, 1932      3 Sheets-Sheet 3
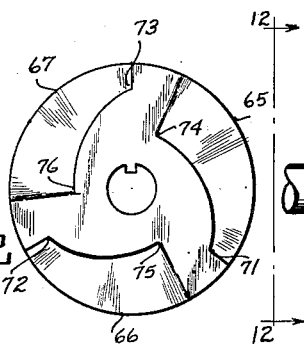
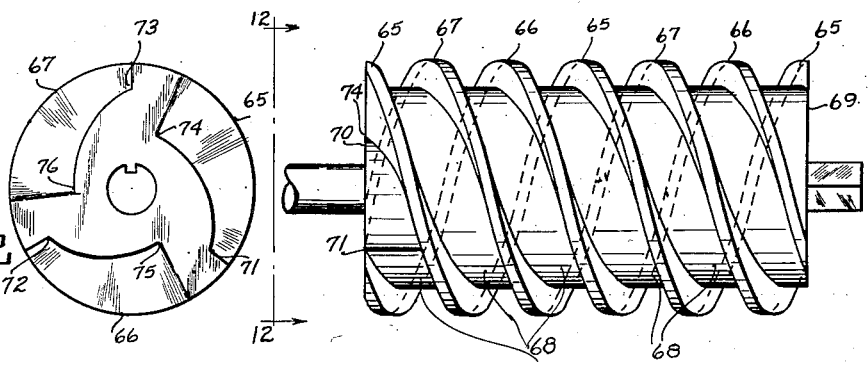
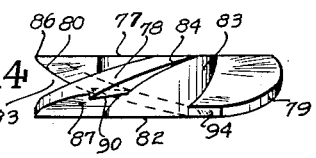
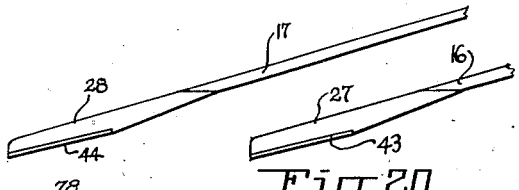
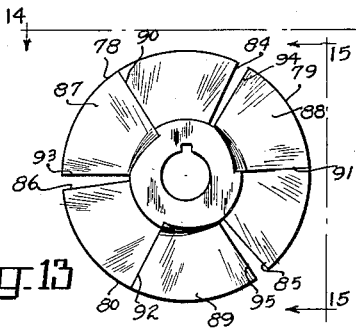
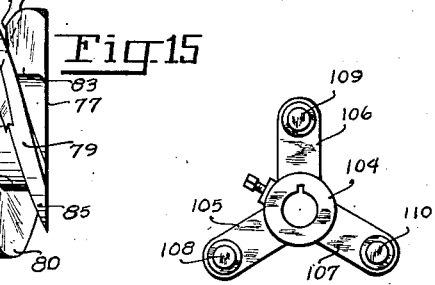
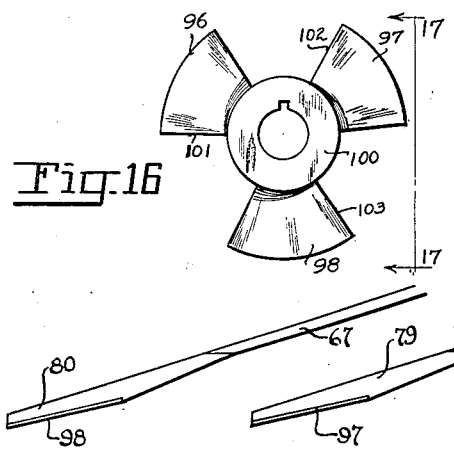
Inventor
Claude C. Hall
By Samuel S. Jacobson
Attorney Patented Feb. 13, 1934

1,946,740

UNITED STATES PATENT OFFICE 1,946,740

APPARATUS FOR MOLDING SUNDRY MATERIALS

Claude C. Hall, Portland, Oreg.

Application December 23, 1932
Serial No. 648,632

6 Claims. (Cl. 107—14)

This invention relates, in general, to apparatus which is applicable for molding sundry mixtures of materials consisting, in the main, of animal and/or vegetable and/or grain meal in ribbons which may be of any shape and which may be divided into pellets suitable for food. The invention relates, in particular, to apparatus, which is applicable for molding into ribbons of small diameter, sundry mixtures of materials having a very low moisture content and suitable for poultry and like fowl and which are capable of being divided into very small pellets.

Attempts have heretofore been made to manufacture pellets suitable for poultry and other fowl, but with no marked or practical success. The market for such feed or meal has been supplied generally by cracking and breaking up larger pellets into small pieces. The manufacture of small pellets is impossible with present types of conveyor worms because those now in use become rapidly clogged and thus prevent the feeding of the materials toward the die-plate.

To overcome these disadvantages and extra steps in the processes of manufacturing small pellets, there is provided apparatus for molding sundry materials which contains a feed-worm whose threads are uniquely arranged, as will more fully appear herein, and which also contains a compression-head of unique design to which is attached a guard-slipper of unique design.

The important object of my invention is to provide means for molding materials into small pellets suitable for poultry food, especially for young chickens. The composition of the material may be varied to satisfy the requirements for the pellets being manufactured.

The molding apparatus comprises, in general, a hopper of the well known type having one end of a cylinder or casing in direct alignment with the outlet opening in the hopper. A feed or conveying worm rotates in the casing, the thread of the worm is slightly spaced from the inner wall of the casing, a compression-head is disposed immediately adjacent the worm and has a guard-slipper to prevent quick wear of the head. The head is so shaped with respect to the worm that any excess pressure on the material around the die-plate is dissipated rearwardly toward the back of the worm. The face of the slipper is in intimate contact with the inner face of the die-plate and forces the material through the openings in the die-plate. Cutting-members, such as rotary-knives or blades, are actuated by the common-shaft or spindle and cooperate with the outer face of the die-plate.

By constructing the worm in the manner herein set forth, the material is continuously carried to the compression-head without fear of creating any excess pressure in the area immediately in front of the die-plate. The material is, therefore, extruded through the small perforations or openings in the die-plate under substantially even normal pressure producing pellets of uniform size and density. As the material extrudes through the openings in the form of long continuous ribbons, the same is cut into short small pellets by blades which are periodically rotated.

Animal and/or vegetable meal is fed into the cylinder at a predetermined volume to assist in avoiding clogging and the double pitched worm forces the material toward the die-plate at a much faster but a more even rate than has heretofore been possible. The material is at the same time compressed between the die-plate and head and then forced to be extruded through the die-plate openings. The cylindrical-knives sever said material from the die-plate into small pellets.

These and other objects of the invention and the means for their attainment will be more apparent from the following detailed description, taken in connection with the accompanying drawings, illustrating one embodiment by which the invention may be realized, and in which:

Figure 1 is a fragmentary, sectional, elevational view of a molding machine showing the conveyor-feed-worm, compression-head and compression-head-guard-slipper assembled within the cylinder, the die-plate at the front end of the cylinder and the knives and compression-head-guard-slipper in intimate contact with the faces of the die-plate. A portion of the die-plate and power-take-off are shown in cross section.

Figures 2, 3 and 4 are perspective, front views of the conveyor-feed-worm, compression-head and compression-head-guard-slipper respectively showing their appearance and relationship to each other prior to their assembly within the cylinder.

Figures 5, 6 and 7 are side views of the conveyor-feed-worm, compression-head and compression-head-guard-slipper respectively effectively showing the pitches of the feed-worm, compression-head and compression-head-guard-slipper and their relationship prior to their assembly within the cylinder.

Figure 8 is an end view of the compression-head taken on line 8—8 of Figure 6, looking in the direction indicated, showing the position of the pitches and their relation to the flat surface which contacts with a corresponding flat surface of the feed-worm (see Figure 2).

Figure 9 is a fragmentary, side view, partially in section, of a feed-worm similar in every respect to the feed-worm shown in Figures 2 and 5 with the exception of having deeper grooves between the threads.

Figure 10 is a perspective, end view of a support for duplicate knives used in conjunction with the assembly of the parts illustrated in Figures 1 to 9 inclusive.

Figure 11 is a side view of a feed-worm having a triple pitch thread but which is in all respects substantially identical to the feed-worm illustrated in Figures 2 and 5.

Figure 12 is an end view of the feed-worm illustrated in and taken on line 12—12 of Figure 11, looking in the direction indicated, showing the position of the pitches at the ends of the threads and their relation to the flat surface which contacts with a corresponding flat surface of the compression-head.

Figure 13 is an end view of a triple compression-head used in conjunction with the feed-worm shown in Figures 11 and 12.

Figure 14 is a top, plan view of the triple compression-head illustrated in and taken on line 14—14 of Figure 13, looking in the direction indicated, graphically showing the different pitches of the compression-head which correspond to the pitches of the threads of the feed-worm illustrated in Figures 11 and 12.

Figure 15 is a side view of the triple compression-head illustrated in and taken on line 15—15 of Figure 13, looking in the direction indicated, showing more graphically the different pitches of the compression-head which correspond to the pitches of the threads of the feed-worm illustrated in Figures 11 and 12 and also showing the shoulders on the front surfaces of the compression-head-pitches which retain the compression-head-guard-slippers relative to the compression-head.

Figure 16 is a triple winged compression-head-guard-slipper adapted to intimately fit against the front end of the triple compression-head and be retained in such position by the shoulders.

Figure 17 is a side view of the triple winged compression-head-guard-slipper illustrated in and taken on line 17—17 of Figure 16, looking in the direction indicated graphically showing the pitches of the guard-slipper which correspond to the pitches of the compression-head.

Figure 18 is an end view of a support for triplicate knives used in conjunction with the feed-worm, compression-head and compression-head-guard-slipper illustrated in Figures 11 to 17 inclusive.

Figure 19 is a fragmentary, diagrammatical layout of the threads of the feed-worm, compression-head and compression-head-guard-slipper illustrated in Figures 11 to 17 inclusive as they appear when laid in a horizontal plane. This view is intended to graphically show the difference in depth between the threads of the feed-worm and the threads of the compression-head to obtain the needed reinforcement in the compression-head and to illustrate the variations in their pitches.

Figure 20 is a fragmentary, diagrammatical layout of the threads of the feed-worm, compression-head and compression-head-guard-slipper illustrated in Figures 1 to 9 inclusive as they appear when laid in a horizontal plane. This view is also intended to graphically show the variation in pitch and the difference in depth between the threads of the feed-worm and the threads of the compression-chamber, but showing a modified manner of constructing the compression-head in order to obtain the needed reinforcement.

One embodiment of my invention is shown in operative position within a cylinder or chamber 1 which may be constructed in any satisfactory manner. The cylinder herein shown is a part of a fanciful molding apparatus or press, designated generally by reference character A. The invention may be used with any type of molding machine or press suitable for making pellets from sundry materials, therefore, no claim is made to unique design of such a molding machine or press. The fanciful machine illustrated in the drawings and designated generally by reference character A, has a hopper 2, only a portion of which is shown, and a base or bottom 3 through which a passage or opening 4 extends. The opening 4 communicates with a chute 5 which is directly aligned and communicates with an inlet or opening 6 that extends through the upper back portion of the cylinder or chamber 1. At the rear end of the chamber is a hub 7 which has a bearing 8 disposed therein. A power-take-off-shaft 9 rotates within the bearing-hub 7 and has a recess-bearing 10 disposed within its free end. Stirring or agitating-members and mechanism for controlling the flow of the material from the hopper into the chute may be associated with the hopper and chute depending, of course, upon the ends desired to be attained, but since the invention only relates to the conveyor-feed-worm-assembly and die-plate-assembly, these features are not illustrated in the drawings and, therefore, are not described herein. The cylinder 1 is shown lying in a horizontal plane, but such disclosure should not be considered a limitation as the cylinder may be placed vertically or at any angle to the rest of the molding apparatus or press without effecting the operation of the invention.

A conveyor-feed-worm embodying my invention, designated generally by reference character B, is rotatably disposed within the cylinder 1. The conveyor-feed-worm has stub-shaft 11 extending outwardly from its rear or receiving-face 12 which is operatively engaged within the recess-bearing 10 of the power-take-off-shaft 9. Another stub-shaft 13, which has a step-down-portion 14, extends outwardly from the front of discharge-face 15 of the conveyor-feed-worm. The functions of this stub-shaft 13 and its step-down-portion 14 will be related shortly.

Referring to Figures 2 and 5 of the drawings, threads 16 and 17 are helically disposed about the periphery of the conveyor-feed-worm, designated generally by reference character B. The threads 16 and 17 have identical pitches and divide the conveyor-feed-worm into a number of spiral-grooves 18 that are adapted to carry the material forwardly from the receiving-face 12. It is important to note that the ends of the threads 16 and 17 are 180 degrees apart, that is, they are directly opposite each other, both at the rear or receiving-face 12, and the front or discharge-face 15 as shown, for example, at 19 and 20. This arrangement permits the spiral-grooves 18 to be of the same width throughout the length of the conveyor-feed-worm.

The spiral-grooves 18 are of different depths. They are shallow throughout the major portion of the conveyor-feed-worm and deep at the front or discharge-face 15 where they are cut away in such a manner that the depth of these grooves are increased from the depths indicated at 21 and 22 to the depths indicated at 23 and 24. By making the grooves 18 at the discharge-face 15 of the conveyor-feed-worm conform to the deep grooves of the compression-head, the construction of which will be presently related, it is possible to utilize the greatest amount of the surface of the inner-face of the die-plate. Also, by this arrangement, an expansion-chamber is formed (with the aid of the compression-head as will be pointed out forthwith) at the front or discharge-face 15 of the conveyor-feed-worm B. This aids in restraining the material from going forward in too large a quantity toward the die-plate and also aids in preventing the clogging of the material within the grooves of the feed-worm and the consequent rotation of the clogged material with the feed-worm.

A compression-head embodying my invention, designated generally by reference character C, is also rotatably disposed within the cylinder 1. The compression-head has a rear or receiving-face 25 which is identical in contour to the front or discharge-face 15 of the feed-worm B. They both lie in parallel planes, coincide and intimately contact each other when assembled within the cylinder as shown in Figure 1.

The compression-head C has threads 26 and 27 helically disposed about its periphery. These threads are of the same pitch and form deep-spiral-grooves 28 therebetween. The ends of the threads 26 and 27 are also 180 degrees apart at the receiving-face 25 and discharge-face 29 of the compression-head, making the spiral-grooves 28 of equal widths. The depths of the grooves 28 of the compression-head is the same as and conforms to the depths of the grooves 18 disposed at the discharge-face 15 of the conveyor-feed-worm B as indicated at 23 and 24 and graphically shown in Figure 1. In this way there is formed a continuous series of grooves between the threads of the feed-worm B and compression-head C whose depths are varied from shallow, between the threads of the feed-worm for the major portion of their travel, to deep between the threads of the feed-worm adjacent the discharge-face 15 and between the threads of the compression-head as graphically illustrated in Figure 1. The threads 26 and 27 have tapered-ends 30 and 31 respectively. These tapered-ends are formed by continuing the threads 26 and 27 respectively in the plane of the rear or receiving-face 25 of the compression-head C. This arrangement allows a smooth joint to be effected when the feed-worm and compression-head are assembled as shown at 32 in Figure 1 and thereby creates a free and unobstructed passage for the material when it travels from the feed-worm into the immediate vicinity of the compression-head. The pitch of the threads 26 and 27, beginning at the rear-face 25 of the compression-head, is identical to and continues to be the same as the pitch of the threads 16 and 17 of the conveyor-feed-worm B, but the pitch decreases when it reaches toward the front or discharge-face 29 of the compression-head C. In this manner a wedge-compression-chamber is formed where the conveyor-feed-worm B and compression-head C meet and this chamber continues throughout the compression-head, so that the material which gets into the chamber is compressed and extruded through the die-plate as will presently appear. The compression-head C has a hub 33 which has a key-slot 34 disposed therein and the compression-head C is maintained in fixed intimate relation with the conveyor-feed-worm B by being keyed or otherwise secured to the stub-shaft 13 of the conveyor-feed-worm.

The portions 35 and 36 of the front or discharge-face 29 of the compression-head are identical in contour to the rear-face of the guard-plate presently to be described. These portions are inset as shown at 37 and 38 forming shoulders, so that when the guard-plate is placed against the front-face 29 of the compression-head C there will be a free and unobstructed passage for the material. The discharge-ends 39 and 40 of the threads 26 and 27 respectively of the compression-head are thicker in order to provide a reinforcement at the point where the maximum pressure is applied in forcing the compound or mixture through the holes in the die-plate to be described.

A compression-head-guard or wearing-plate, embodying my invention, designated generally by reference character D, is also rotatably disposed within cylinder 1 and is adapted to be placed at the discharge-face 29 of the compression-head C. This guard-plate is constructed of a material that will withstand the excessive pressure to which it is subjected and prevent premature wear of the compression-head. The guard-plate is primarily intended to prevent the necessity of replacing the entire compression-head when the forcing-surface has become worn. The guard-plate has a hub 41 which has a key-slot 42 disposed therein. A pair of wings 43 and 44 extend from the hub. The front or discharge-face 45 and the forcing-edges 46 and 47 of the wings 43 and 44 respectively are in spaced working relation to the face of the die-plate. The rear-face 48 of the wings 43 and 44 are equal in area and identical in contour to the portions 35 and 36 respectively of the front or discharge-face 29 of the compression-head. They lie in the same planes, coincide and intimately contact the portions 35 and 36 respectively. The forcing-portions 46 and 47 are also disposed at 180 degrees apart and, when the feed-worm, compression-head and guard-plate are assembled in working relation, they perform their respective functions as if they were one continuous element as graphically shown in Figure 1. The guard-plate is secured in fixed relationship to the compression-head by being keyed or otherwise secured to the shaft 13 of the feed-worm.

A die-plate, designated generally by reference character E, is removably secured to the open end of the compressing-chamber of cylinder 1 in any desired manner, as by retaining-head 49 whose flange 50 is secured to the compression cylinder 1 by any suitable means, as by bolts 51 and nuts 52. The die-plate has a flange 53 which fits into the ledge 54 of the retaining-head. In this manner the die-plate is kept from rotating. The die-plate has a plurality of perforations or openings 55 disposed therethrough.

A cutting-knife-support, designated generally by reference character F, is in working relationship with the die-plate. The support consists of a bar or main-body-member 56 which has a hub 57, having a key-slot 58 therein, disposed centrally thereof and stub-shafts or arms 59 and 60 extending therefrom adjacent the ends. The cutting-knife-support is adapted to be removably secured to the step-down-portion 14 of the shaft 13, which extends through and beyond the die-plate, in any suitable manner, as by being keyed thereto. The arms 59 and 60 have cutting-knives 61 and 62 rotatably mounted thereon. The cutting-knife-support may be adjustably positioned relative to the outer-face 63 of the die-plate to produce the proper spacing between the cutting-knives 61 and 62 and the outer-face 63 by any suitable means, as by set-screw 48. The cutting-knife-support F is positioned about the shaft 13 in such a manner that it immediately follows the forcing-edges 46 and 47 of the guard-plate D. Thus when the assembly is rotated, the compound is compressed and forced through the holes 55 in the die-plate and is then cut off by the knives 61 and 62.

The material to be compressed and molded into pellets enters the cylinder through opening 6 and is immediately engaged and carried by the feed-worm forwardly within the cylinder toward the compression-head and guard-plate. When the material reaches the compression-head it is compressed and forced through the perforations in the die-plate extruding the material in shaped lengths which are then cut into pellets of the desired length as the material exudes at the front-face or delivery-end of the die-plate.

By constructing the feed-worm, compression-head and guard-plate in the manner illustrated, the molding apparatus in which they operate has its capacity almost doubled without increasing the pressure within the cylinder since the material is more equally distributed around the assembly including the inner-face 64 of the die-plate. Consequently, there is a marked decrease in the wear of the conveyor-feed-worm, compression-head-guard-plate and die-plate.

In Figure 9 is shown a slightly modified form of conveyor-feed-worm. This feed-worm is similar in every respect to the feed-worm B shown in Figures 2 and 5 except that the depths of all of its grooves 18 conform to the depths of the grooves 28 of the compression-head C. The grooves are deeper and closer together but of equal width and the feed-worm herein illustrated can be used in conjunction with the compression-head C and the guard-plate D illustrated in Figures 3 and 4 and 6 to 8 inclusive. By constructing the feed-worm as illustrated in Figure 9, a greater volume of material may be carried and delivered to the die-plate.

In Figures 11 and 12 is shown a conveyor-feed-worm slightly modified from the feed-worms illustrated in Figures 2, 5 and 9, but embodying my invention. This conveyor-feed-worm has threads 65, 66 and 67 helically disposed about its periphery and which have similar pitches and divide the conveyor-feed-worm into a number of spiral-grooves 68 of equal width since the ends of threads 65, 66 and 67 are 120 degrees apart both at the rear or receiving-face 69 and the front or discharge-face 70 of the conveyor-feed-worm.

The spiral-grooves 68 are shallow throughout the major portion of the feed-worm and deep at the front-face 70 where they are cut away in such a manner that the depth of these grooves are increased from the depths indicated at 71, 72 and 73 to the depths indicated at 74, 75 and 76. By making the grooves 68 at the discharge-face 70 conform to the grooves of the compression-head illustrated in Figures 13, 14 and 15, substantially all of the die-plate is utilized for production purposes.

The compression-head C is slightly modified for use in conjunction with the feed-worm illustrated in Figures 11 and 12. The rear or receiving-face 77 of the compression-head is identical in contour and coincides with the discharge-face 70 of the feed-worm. The compression-head has threads 78, 79 and 80 spirally disposed about its periphery and helical-grooves 83 are formed therebetween. The ends of the threads 78, 79 and 80 are also 120 degrees apart at the receiving-face 77 and front or discharge-face 82 of the compression-head, making the spiral-grooves 83 of equal widths. The depths of the grooves 83 of the compression-head are the same as and conform to the depths of the grooves 68 disposed at the discharge-face 70 of the conveyor-feed-worm. In this way there is formed a continuous series of grooves between the threads of the feed-worm and compression-head whose depths are varied from shallow, between the threads of the feed-worm for the major portion of their travel, to deep between the threads of the feed-worm adjacent the discharge-face 70 and between the threads of the compression-head. The threads 78, 79 and 80 have tapered-ends 84, 85 and 86 respectively. These tapered-ends are formed by continuing the threads 78, 79 and 80 respectively in the plane of the front or discharge-face 70 of the compression-head. This arrangement allows a smooth joint to be effected when the feed-worm illustrated in Figures 11 and 12 and compression-head illustrated in Figures 13, 14 and 15 are assembled. The pitch of the threads 78, 79 and 80, beginning at the rear-face 77 of the compression-head, is identical to and continues to be the same as the pitch of the threads 65, 66 and 67 of the conveyor-feed-worm; but the pitch decreases when it reaches toward the front or discharge-face 82 of the compression-head. In this manner a wedge-compression-chamber is formed where the conveyor-feed-worm and compression-head meet and this chamber continues throughout the compression-head, so that the material which gets into the chamber is compressed and extruded through the die-plate.

The portions 87, 88 and 89 of the front or discharge-face 82 of the compression-head are identical in contour to the rear-face of the modified form of guard-plate presently to be described. These portions are inset as shown at 90, 91 and 92 forming shoulders, so that when the guard-plate is placed against the front-face 82 of the compression-head there will be a tight fitting connection. The discharge-ends 93, 94 and 95 of the threads 78, 79 and 80 respectively of the compression-head are thicker in order to provide a reinforcement at the point where the maximum pressure is applied in forcing the compound or mixture through the holes in the die-plate.

The guard or wearing-plate D is also slightly modified as shown in Figures 16 and 17 in order that it may be used in conjunction with the modified feed-worm and modified compression-head. This modified guard-plate has a rear or receiving-face 99 and a front or discharge-face 100. The guard-plate has a multiple of wings 96, 97 and 98 which are, together with the rear-face 99, equal in area and identical in contour to and coincide with the portions 87, 88 and 89 respectively of the front or discharge-face 82 of the compression-head. The wings have forcing-portions 101, 102 and 103 which are also disposed 120 degrees apart and when the modified feed-worm, compression-head and guard-plate are assembled in working relation they perform their respective functions as if they were one continuous element.

The cutting-knife-support is also slightly modified for use with the modified forms of feed-worm-compression-head and guard-plate. This support consists of a main-body-member 104 which has arms 105, 106 and 107 extending radially therefrom at 120 degrees. These arms have stub-shafts 108, 109 and 110 extending outwardly therefrom. These shafts carry cutting-knives identical to those illustrated in Figure 1.

By constructing the feed-worm, compression-head, guard-plate and knife-support in the manner illustrated in Figures 11 to 18 inclusive, a much greater amount of material to be molded into pellets of very small circumference is conveyed more uniformly to the compression-chamber formed between the inner-face of the die-plate and the front or discharge-face of the guard-plate without increasing materially the pressure within said chamber. This accomplishment is possible because the multiple threaded feed-worm takes "bites" of sufficient size to convey a continuous stream of the material into the compressing-chamber which, in turn, at all times delivers an adequate quantity of the material to the inner-face of the die-plate but not such amounts as to cause great pressure thereon. It should be apparent that by utilizing the invention herein described, pellets of very small diameter can be made with the type of molding machines now in use without decreasing the speed or changing said machine in any particular.

In Figure 19 is shown diagrammatically the varying thicknesses between the feed worm threads 65, 66 and 67 and the compression head threads 78, 79 and 80. This drawing also indicates the relationship of the feed worm and compression head threads and the guard slipper.

Figure 20 of the drawings illustrates the same principles discussed above except that they are applied to a double threaded feed worm, compression head and guard slipper.

It will thus be seen that there is herein described apparatus in which the several features of this invention are embodied, and which apparatus in its action attains the various objects of the invention and is well suited to meet the requirements of practical use. Some changes in the above construction may be made by those skilled in the art without departing from the scope of the invention. It is, therefore, intended that all matters contained in the above description or shown in the accompanying drawings shall be interpreted as illustrative and not in a limiting sense.

Having thus described my invention, what I claim as new and desire to secure by Letters Patent is:

1. A conveyor-feed-worm to be used with apparatus of the class described, comprising a cylindrical body element, a plurality of threads helically disposed about the periphery of said body element to thereby form spiral-grooves, said threads being of the same pitch and arranged about the periphery, so that their ends are equidistant from each other, and said grooves being shallow for the major portion of said body element and deep immediately adjacent the front-face thereof.

2. A compression-head to be used with apparatus of the class described, comprising a cylindrical body element, a plurality of threads helically disposed about its periphery to thereby form spiral-grooves, said threads arranged about the periphery, so that their ends are equidistant from each other, a plurality of tapers formed at the rear ends of the threads to thereby make said threads coincide with the threads on the front end of the conveyor-feed-worm as characterized in claim 1 thus merging the spiral-grooves of the compression-head with the spiral-grooves of the conveyor-feed-worm, a plurality of shoulders disposed within the front-face of the compression-head, and a multiple winged wearing-plate intimately secured to the front-face of the compression-head and held in fixed relationship thereto by said shoulders.

3. A feed worm to be used with a chamber and a die-plate of the class described comprising a body member having a plurality of helically disposed threads around its outer face and thus forming shallow grooves therebetween for the major portion of its length and deep grooves immediately in back of the front face of said member, said threads having the same pitch throughout their length, and means associated with the front face of said member for diminishing the pressure incident to the inner face of the die-plate and front face of said means.

4. A device as characterized in claim 3 wherein the means for diminishing the pressure possesses multiple threads which form grooves of equal depth to the grooves immediately in front of the face of the feed worm.

5. In a molding machine having a chamber therein, a conveyor-feed-worm rotatably disposed therein and comprising a cylindrical body-element having a plurality of threads helically disposed about the periphery thereof to thereby form spiral grooves, said threads being of the same pitch and arranged about the periphery, so that their ends are equidistant from each other and said grooves being shallow for the greater portion of said body-element and deep immediately adjacent the front face thereof, a compression-head disposed adjacent the front face of said conveyor-feed-worm and comprising a cylindrical body-element having a plurality of threads helically disposed about its periphery to thereby form spiral grooves, said threads being of the same pitch and arranged about the periphery, so that their ends are equidistant from each other, and having a plurality of tapers formed at the rear end thereof to thereby make said threads coincide with the threads on the front face of the conveyor-feed-worm, a plurality of shoulders disposed within the front face of the compression-head and means in intimate engagement with said shoulders for protecting the front end of said compression-head.

6. A device as characterized in claim 5, wherein the means for protecting the compression-head comprises a multiple-winged wearing-plate intimately secured to the front face of the compression-head and held in fixed relationship thereto by the shoulders thereof.

CLAUDE C. HALL.